US007821618B2

(12) United States Patent
Reime (10) Patent No.: US 7,821,618 B2
(45) Date of Patent: Oct. 26, 2010

(54) METHOD FOR LIGHT PROPAGATION TIME MEASUREMENT

(76) Inventor: Gerd Reime, Klotzbergstrasse 60i, Buhl (DE) 77815

( * ) Notice: Subject to any disclaimer, the term of this patent is extended or adjusted under 35 U.S.C. 154(b) by 340 days.

(21) Appl. No.: 11/997,273

(22) PCT Filed: Jul. 29, 2006

(86) PCT No.: PCT/EP2006/007549

§ 371 (c)(1),
(2), (4) Date: Jan. 29, 2008

(87) PCT Pub. No.: WO2007/012501

PCT Pub. Date: Feb. 1, 2007

(65) Prior Publication Data

US 2008/0204700 A1    Aug. 28, 2008

(30) Foreign Application Priority Data

Jul. 29, 2005   (DE) ................. 10 2005 036 354
Sep. 27, 2005   (DE) ................. 10 2005 045 993

(51) Int. Cl.
  *G01C 3/08*   (2006.01)
(52) U.S. Cl. .................. 356/5.01; 356/5.1; 356/5.15
(58) Field of Classification Search ........ 356/3.01–28.5
  See application file for complete search history.

(56) References Cited

U.S. PATENT DOCUMENTS 5,054,911 A * 10/1991 Ohishi et al. ............... 356/5.07

| | | | | |
|---|---|---|---|---|
| 5,796,098 A | * | 8/1998 | Azzam | 250/231.13 |
| 6,031,600 A | * | 2/2000 | Winner et al. | 356/3.01 |

FOREIGN PATENT DOCUMENTS

| | | | |
|---|---|---|---|
| DE | 100 01 955 | | 7/2001 |
| DE | 10022054 | * | 7/2001 |
| DE | 100 22 054 | | 11/2001 |
| DE | 101 33 823 | | 2/2003 |
| DE | 103 00 223 | | 6/2004 |
| DE | 103 22 552 | | 12/2004 |
| EP | 0 706 648 | | 4/1996 |
| WO | WO 01/90778 | | 11/2001 |

OTHER PUBLICATIONS

International Search Report; PCT/EP2006/007549; Date Mailed Oct. 2, 2006.

* cited by examiner

*Primary Examiner*—Thomas H Tarcza
*Assistant Examiner*—Luke D Ratcliffe
(74) *Attorney, Agent, or Firm*—Cantor Colburn LLP (57) ABSTRACT

Disclosed is a method and a device for light propagation time measurement, wherein a light signal is transmitted from at least one transmitter into a light path via a retroreflective object to a receiver for detecting the alteration of the first signal, presence, and/or distance of the object, the received signal being determined from the path and compared with a second signal produced without the light path to achieve a comparison value, which regulates amplitude values of the transmitted signal and/or of the second signal, a clock change signal corresponding to the light propagation time between received signal and second signal is detected cyclically, a difference value being determined by comparing change signals between received signal and second signal , the difference value being altered by means of a phase shifter , delay of the phase shifter that occurred given a minimal difference value determining the light propagation time.

22 Claims, 5 Drawing Sheets

METHOD FOR LIGHT PROPAGATION TIME MEASUREMENT

CROSS REFERENCE TO RELATED APPLICATIONS

The present application claims the priority of the German Patent Applications 10 2005 036 354.7 filed on 29 Jul. 2005, and 10 2005 045 993.5 filed on 27 Sep. 2005, the disclosure whereof is hereby expressly incorporated into the subject matter of the present application by reference.

TECHNICAL FIELD OF THE INVENTION

The invention relates to a method and a device for light propagation time measurement.

BRIEF DISCUSSION OF RELATED ART

The distance of a reference object relative to other objects has to be determined in many fields of application. One such field of employment is, above all, that of camera systems, e.g. in the automotive field too or in the field of robotics.

Hereby, the following problem with the state of the art occurs: If one applies a pulsed voltage to a light emitting diode, then it lights up at the rhythm of this applied voltage. A reflecting object can reflect the radiated light power to a photodiode that is preferably located in the proximity of the sending LED. The magnitude of the reflected signal is dependent on the transmitting power of the LED, the reflection factor of the object and the distance of the object from the sending LED. In the case of the distance of a reflecting object e.g. a hand, being e.g. one metre and using a commercial LED having an e.g. 100 mA current pulse, an opening angle of e.g. 15° and a commercial low cost photodiode, e.g. BPW 34 made by Osram, a photo current of e.g. some μA caused by reflection at the hand will occur in the photodiode. This photo current naturally changes with the distance of the reflecting object so that it amounts to possibly just a few pA in the photodiode at distances of greater than one metre. In order to measure the distance of the reflecting object, the use of a light propagation time measurement between the sent and the received signal is of course possible, but in the case of the above mentioned very small received current in the photodiode, it is very difficult to determine the exact point of incidence.

Making it still more difficult is the fact that the signal entering the photodiode or the amplifier connected thereto does not produce the flank steepness with which it was sent. The photodiode works as a low-pass filter, especially if a large one (a large receiving surface area) is selected for the purposes of increasing the sensitivity. The light propagation time is approximately 1 ns for a distance of approximately 15 cm. Due to the low-pass characteristic of the photodiode and the preamplifier mentioned above, the rise time of the received signal can easily amount to 10 μs. The sending LED also has a noticeable rise time, but this however, is orders of magnitude below the low-pass characteristic of low cost photodiodes. It usually lies within the range of 5 to 10 ns and is not taken into account in the further description.

The process of detecting the precise moment of incidence of the reflection signal thus causes substantial difficulties and so many patent applications are concerned with improving the process of detecting the exact moment of incidence of the reflection signal.

It is generally known that larger reflection distances of e.g. some 10 to 100 m can be determined more easily in this way.

Furthermore, a measurement from above approx. 3 m to 250 m is simpler than a measurement in the near field of 0 to 3 m, wherein measurements must be made to an accuracy measured in ns, this again making it necessary to use photodiodes and amplifiers in the GHz range. Adding still more to the difficulty is the problem of ambient light, temperature and the respective reflection factor of the object being measured. These parameters are usually very significant in the distance measuring process. However, in practice hereby, quite substantial transmitting powers (e.g. pulsed 10 W lasers) are often used.

Even if the time point of the received signal were to be specified precisely, a further unwanted effect arises. Additional ambient light in the photodiode somewhat changes the amplitude and the rise time of the received signal so that the distance measuring process can also be affected by ambient light.

From DE 100 01 955 A1 on which the preambles of the independent claims are based a device for detecting a position and/or a movement is known, so that specific motion pattern can be detected for switching an optoelectronic switch. The light emitters are operated alternately and in time slots by a clock generator. The light regulated in amplitude from at least one light path is effective, when necessary with the light from a further light emitter such as an e.g. compensating light source, on the light receiver in such a way that a received signal is developed without clock synchronous signal components. The light path of the further signal can also be known as regards its length. The received signal from the light receiver is supplied to a synchronous demodulator which breaks down the received signal into the signal components corresponding to the two sources of light. These are compared with one another in a comparator, whereby a signal corresponding to a zero state without extraneous light components is produced. If there is no signal corresponding to this zero state at the output of the comparator, the radiating power that is supplied to the light sources is appropriately regulated until this state is reached.

The same principle is used in EP 706 648 B1 or in DE 103 00 223 B3 to detect light signals between light emitters and light receivers whilst compensating for external influences such as ambient light, temperature or aging effects. The principle is also used in DE 101 33 823 A1 wherein all emitters enlighten the surrounding together in an additional clock cycle in order to detect the distance between the object and the sensor in a third dimension.

One possibility for the distance measuring process, is that of measuring the light propagation time between a transmitter sending out a light beam, an object reflecting this light beam and a receiver. Due to the high speed of light and the desired degree of accuracy for the measurement, one nowadays works with extremely fast amplifiers and intentionally selected small photodiodes which can be operated at a high frequency of e.g. 100 MHz.

An optical distance sensor is known from DE 100 22 054 A1, wherein use is made of the phase shift between the sending and the received light beam for the distance measuring process. To this end, the received signal having a minimum amplitude is supplied to a synchronous rectifier together with the voltage of an oscillator. Thus, a signal originating from the light path is supplied to the inputs of the synchronous rectifier together with a purely electrically transmitted signal. The output signal present at the output of the synchronous rectifier is regulated by controlling a delay member until such time as there is a change of prefix sign, until the average value of the two signals at the output is about zero. Hereby, the synchronous rectifier has the task of breaking down the signal into very precise phases. Component-related delays, aging and temperature effects are separately referenced and compensated. Even when a reference light path is used, the control process takes place electrically by influencing the delay member. Thus, the photodiode signal and the purely electrically transmitted signal shifted through 90° or 270° are supplied to a classical synchronous rectifier for phase detection purposes. To this end, the signals before the synchronous rectifier are not equal to zero, so that the average value can be approximately zero with the goal of keeping the respective signal sections of the received signal equally long.

Furthermore, a method for measuring distances by a propagation time measurement is known from WO 01/90778 A1, wherein the transmitted signal and the received signal present at the receiver are addressed at the same clock rate. The control signals determined in this way are shifted in such a manner by means of a phase shifter that the deviation in distance between the distance to the target object determined by means of the propagation time measurement and the actual distance becomes minimal. The goal is to optimise the sampling points with the propagation time at high frequencies.

From DE 103 22 552 A1, it is known to supply a light beam reflected at an object as well as a light beam from a second light path, which originates from a further transmitter or a compensation light source, to the receiver in parallel or at the same angle. Namely, if light from one light source is beamed into the photodiode from the front on the one hand and is coupled in laterally from a further light source, then the rise time increases significantly in the case of a pulsed current in the light signal when it is coupled-in laterally. Thus stray light has a substantially greater influence when coupled-in laterally. The dimensionless point on the light intensity photo current characteristic that occurs in the event of complete compensation is thus again a path on the characteristic of the photodiode which is subject to the effects of extraneous light. The same angle of incidence for the received signal and the compensation signal is therefore optimal.

BRIEF SUMMARY OF THE INVENTION

Based on this prior art, the invention provides a method for a light propagation time measurement which can also work in particular with cameras using more expedient components and low frequency amplifiers.

Clocked signals are transmitted to the receiver from at least two transmitters which can be sources of light or compensation light sources in the form of LEDs. The light source sends the light to an object the distance/reflection of which is to be determined. The reflected light is led to the receiver. The compensation light source sends the light from a fixed distance directly into the receiver. The received signals from the light source and the compensation light source are compared with one another and regulated so as to have the lowest possible differences therebetween by means of an amplitude control and a phase control so as to compensate for influences such as reflection, extraneous light, temperature and aging. The control values for the amplitude control or phase control then correspond to the value of the reflection or the light propagation time. To this end, the received signal of a clock cycle from a light source and the compensation light source is sub-divided into preferably approximately four equal sections. If the switch-on time of the light source is designated by the sections A and B and the switch-on time of the compensation light source by C and D, then the sections A and C are compared and regulated to have the lowest possible differences therebetween by means of a phase shift process. The sections B and D are likewise regulated to have the lowest possible differences therebetween by means of an amplitude control. The information relating to the light propagation time is in the sections A and C, the information about the reflection factor is in the sections B and D. The light propagation time and thus the distance between the light source and the object or the receiver can then be determined from the delay of the phase shifter.

The compensation enables the clock synchronous signal components to be completely eliminated, i.e. only the actual amplifier noise remains. The photodiode amplifier can thus have a very high amplification factor, or could even be implemented as a highly amplifying limiter amplifier.

Thus, the clock pulse alternation signals occurring at a clock pulse alternation are detected and a difference, which is minimized by means of a phase shifter, is determined therefrom. The light propagation time and thus the distance between transmitter and object or receiver can be determined from the delay of the phase shifter. The compensation enables the clock synchronous signal components to be eliminated on the one hand i.e. only the amplifier noise remains. Due to the high amplification of the received signal, the peak at the clock pulse alternation appears clearly. This peak arises at the respective clock rate of the transmitting light source and the compensation light source with differing polarity with respect to the average value of the noise and arrives at two inputs of a comparator that are appropriately switched in synchronism with the clock rate in the corresponding time periods. This clock pulse alternation signal is dependent on the reflection insofar as the amplitude thereof is concerned, but as according to the invention merely the amplitude difference value between two alternating clock pulse alternation shall be minimised, the difference value of the signal can be demodulated in amplitude from clock pulse to clock pulse in synchronism with the clock rate and can be used for the control of the phase shifter. Due to the clock rate, the time point for the occurrence of the clock pulse alternation signal is known so that only the peak needs to be detected here. At the same time, any arbitrary clock rate can be worked with.

The synchronous demodulator is thus used for a clocked-section type amplitude detection, at the input whereof there is preferably present a regulated zero signal from both paths of the preferably optical balance or from a first light signal and a voltage signal from a second path that was transmitted in an electronic manner. In the first case, two light paths are fed outward independently of each other, these being regulated in respect of the amplitude thereof in such a manner that the received signals at the input of the centering amplifier or synchronous demodulator are already mutually zero and hence there is no changing signal. If a signal is still present at the output of the synchronous demodulator and the comparator, the light output power of at least one transmitter is affected by means of a centering stage or a comparator by a regulator in such a way that this signal is mutually regulated to zero in a clocked manner and thus too the signal at the input of the synchronous demodulator. From the remaining zero signal, which actually then consists of only the amplifier noise without clock synchronous alternating components, a possibly occurring clock pulse alternation signal can then be detected in the noise at the output of the amplitude detector and again regulated to zero. This value can also be sampled at an arbitrary time point at which a phase information is no longer present. This difference value of the non phase-true amplitude values is changed in the phase shifter until it reaches a minimum and preferably zero in order to thereby determine the light propagation time.

Thus, a camera having 3D capability can be constructed. The determined signals can be evaluated in such a way that the distance measuring process is effected at the same time or almost at the same time as the reflection measurement and, in addition, the occurring light signals are also present in the form of image information. If the pixels of a camera are controlled thereby, there is provided a very expedient and accurately working image capturing means due to the precise distance measuring process.

Due to the two closed control loops for an amplitude regulating process on the one hand and a propagation time regulation process on the other hand to a respective "0-clock pulse synchronous" component, the following advantages are achieved in particular too, for employment in cameras:
  very high sensitivity
  very good propagation time measurement even at close range (to "0" distance)
  no extraneous light sensitivity
  no temperature effects on the detection of the propagation time
  use of low frequency components (CMOS technology)
  use of large surface area low cost photodiodes having a high self-capacitance
  use of LEDs as transmitters (low transmitting power)
  non critical in regard to changes in the preamplifier parameters
  no influence of the reflection properties of the reflecting body on the distance measurement It is advantageous to control the phase shift between the first light signal over the light path and the second signal from the further transmitter or the compensation element by means of a control loop in which the difference value of the clock pulse alternation signals serves as a control signal which is minimized by the control process.

It is of advantage, if the light from the light path and from the further optical path is incident on the receiver at the same angle insofar as possible. Diverting means can be provided for this purpose.

Further advantages will appear from the following description and the further claims.

BRIEF DESCRIPTION OF THE FIGURES

The invention is described in more detail hereinafter with the aid of the exemplary embodiments illustrated in the Figures. Therein.

DETAILED DESCRIPTION OF THE INVENTION

The invention is now described in more detail in exemplary manner with reference to the accompanying drawings. Nevertheless, the exemplary embodiments are merely examples which are not intended to restrict the inventive concept to a certain arrangement.

Before the invention is described in detail, it should be pointed out that it is not restricted to the particular components of the circuit or the particular method steps since these components and methods can vary. The terms used here are merely intended to describe special embodiments and are not used in a restrictive manner. If, in addition, the singular or indefinite article is used in the description and in the Claims, this also refers to a plurality of these elements as long as the general context is not unambiguously making something else clear.

The invention enables a distance measurement to be made which permits of an accurate light propagation time measurement that is free of extraneous light problems, independently of the degree of reflection, using large surface area low cost photodiodes and amplifiers having a narrow bandwidth. Moreover, it is possible to make a propagation time measurement in a range close to the surface of the sensor up to larger distances without having to switch-over the measuring range. The preferred aim for the employment thereof is for cameras, although the invention is described hereinafter only with reference to one pixel.

Figure 4:
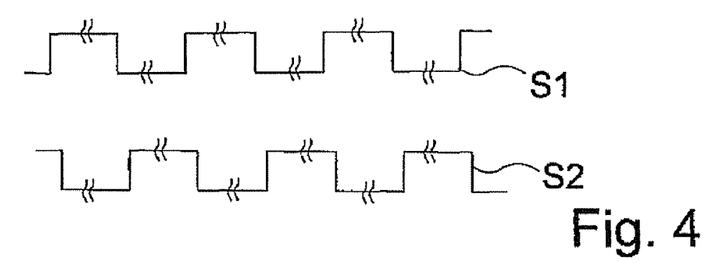

The invention proceeds from the following consideration: An LED (or laser) sends out pulses at e.g. 100 kHz and a mark-to-space ratio of 50% which are reflected by a reflecting object distanced approx. 15 cm away and received by a photodiode serving as a receiver 13. From a theoretical viewpoint, the received pulse thus appears delayed in time by approx. 1 ns relative to the transmission pulse. The time difference, i.e. the late arrival of the transmission pulse is firstly separated from the actual pulse information. To this end, a second LED, which sends its light power output directly to the photodiode without the detour of the reflection path, is activated in the pulse break of the transmission pulse. If, in accordance with FIG. 4, both light power outputs S1, S2 arrive at the photodiode with equal amplitude (which can be kept at the same magnitude by an amplitude control for the LEDs), a substantially constant light signal consisting of light alternating from the two LEDs and a possible extraneous light component appears at the photodiode. This constant light thus produces a substantially non clock synchronous modulated direct current in the photodiode. Self-evidently, the second signal does not have to be present as a light signal, but it could also be present in an electronic manner as a voltage signal.

Upon closer inspection, a propagation time difference of 1 ns is impressed on the direct current at the transition of the transmission pulses of the two LEDs. In one phase, there is a gap in the "constant light" of the alternating LEDs at that point where the LED located in the proximity of the receiver has already switched off, but the light of the second LED still has to traverse the 15 cm to the reflecting object and back. In the second phase, the LED in the proximity of the photodiode is already sending light, while light is still on its way to the photodiode from the second LED which was of course switched off at the correct time point. This is illustrated schematically in FIG. 5. This results in a very short peak of phase synchronous alternating polarity in the received signal. This time difference is extremely small for the receiving photodiode so that it only appears as an extremely small change in the value of the current in the case of a low-pass characteristic of e.g. 200 kHz (a large surface area photodiode e.g. BPW 34).

Figure 5:
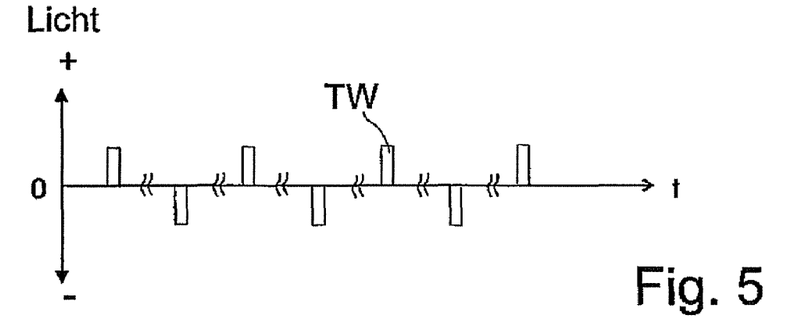

Thereupon, the law of conservation of energy is utilised: If we assume that only the LED directed outwardly towards the reflecting object was clocked to send and the LED directed towards the photodiode was off, then the photodiode receives an alternating light, which, represented in the form of a voltage e.g. an alternating voltage of 10 mV, occurs at an output of an arbitrary alternating voltage amplifier located downstream of the photodiode. If we could proceed from the concept of an ideal photodiode and an ideal amplifier having an ideal rise time characteristic, we would continue to assume a 10 mV output signal having a 50% duty cycle in the case of a sending LED. If one adds the second LED thereto, pulses of 1 ns that alternate clock-synchronously in the positive and negative direction will occur because of the propagation time of a signal (FIG. 5). Then, in the case described, these pulses are the only information in the amplified signal and represent the propagation time information. In practice however, the "low-pass behaviour" of the photodiode and the amplifier will "swallow up" this extremely short pulse.

Figure 6:
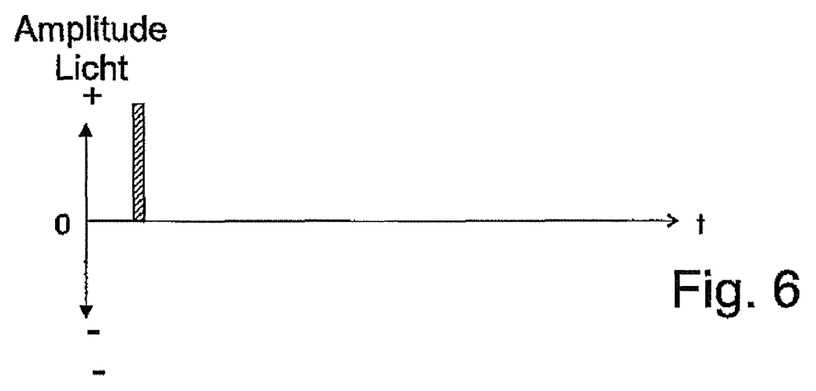
Figure 7:
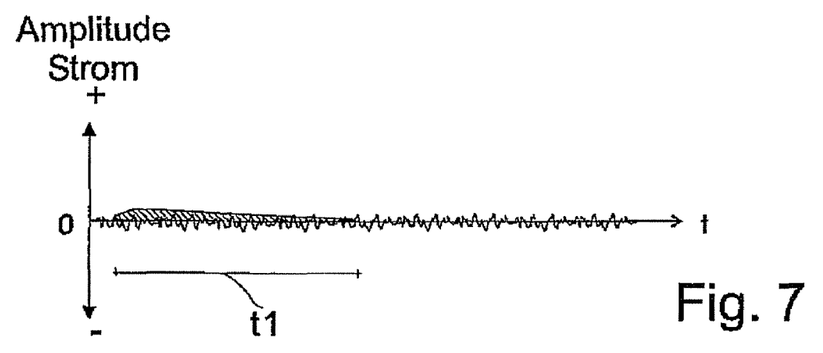

Here, the advantage of the amplitude-type regulated system in accordance with the invention becomes significant: Since only the short pulses in the form of a change information are present at the photodiode, the photodiode signal can be amplified virtually at will e.g. by an amplification factor of ten thousand. The theoretical light pulse of 1 ns length and in the ideal case of 10 mV at an ideal amplifier output does in fact, in practice, only produce a heavily rounded voltage swing of e.g. 10 µV (schematically FIG. 6) which however, now results in a signal of 100 mV with a length t1 of e.g. 5 µs after a ten thousandfold amplification process (FIG. 7). Hereby, no particular demands are imposed on the amplifier, a 200 kHz bandwidth suffices for a corresponding amplification. The signal appears after switching over from one LED to the second one after the switch-over time point in alternating directions (positive, negative). The received signal can be examined at this time point for synchronous signal components by a rectifier that is switched in synchronism with the clock rate. Signal components occurring due to propagation time differences can still be detected perfectly in a very noisy signal, such as occurs in the photodiode due to e.g. photon noise in the event of direct sunshine onto the photodiode, by simple integration of the synchronously demodulated signal components. It should be mentioned that the synchronous rectifier or synchronous demodulator D1, D2 is not a circuit which has to precisely detect the phase, but one which detects the amplitude in clocked manner. The phase accuracy does not have any influence on the accuracy of the measurement so that a phase shift of e.g. 20° is still irrelevant.

Since the occurrence of these clock synchronous signal components indicates a propagation time difference between the two LEDs and in addition, permits a clear allocation to the LEDs, a control loop in accordance with FIG. 1 (see below) can be closed using this information in such a manner that the signal from the LED radiating directly into the photodiode is shifted by the same amount as the light reflected by an object using known means (controllable propagation time e.g. by means of an adjustable all-pass network or a digitally adjustable phase shift). The necessary displacement of the electrical control pulse at the phase shifter 17 (FIG. 1) for the directly radiating LED 12 is then a direct measure for the light propagation time and thus too, a direct measure for the distance of the reflecting object.

After the synchronous demodulation of the propagation time dependent signal components, the two signal components can self-evidently be compared with one another for mutual regulation to "0" by means of a phase shift of the directly radiating LED e.g. in further high amplification operational amplifiers—without any particular demands on the bandwidth. If a very small difference between the two clock synchronous signal components is then still present, this is regulated to "0" by the phase control. Although arbitrary amplifiers are employable, alternating voltage amplifiers are preferably used.

Figure 1:
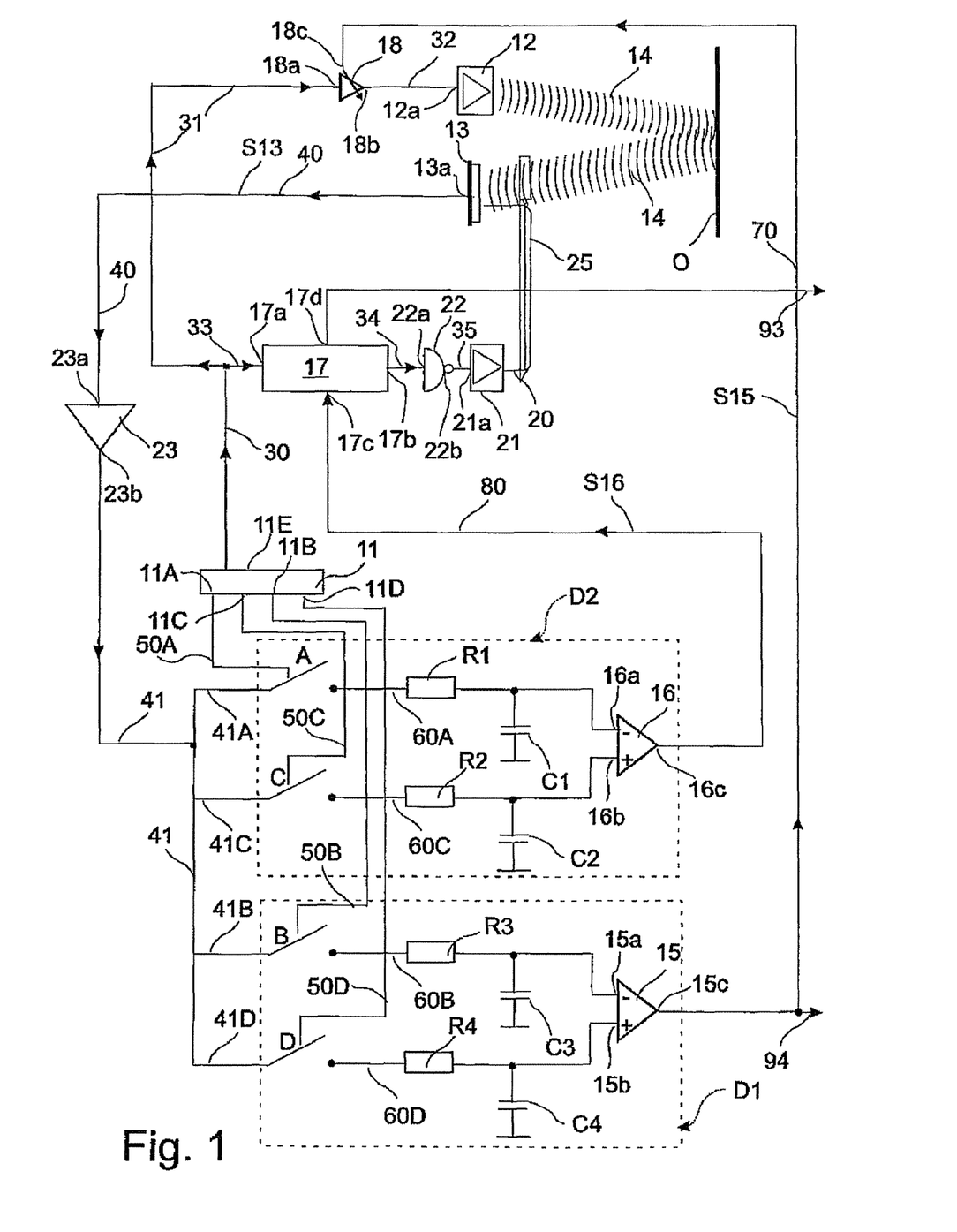
FIG. 1 shows a schematic circuit diagram of a circuit in accordance with the invention for a light propagation time measurement, FIG. 2 the received signal present at the receiver illustrated in FIG. 1 compressed for reasons of simplification with the appertaining sub-division into different ranges, FIG. 3 the signal in accordance with the upper part of FIG. 2 after the employment of the phase shifter, FIG. 4 the light waveform at the receiver from the measuring path with and without a light path, FIG. 5 the resulting light signal at the photodiode, FIG. 6 a pulse from FIG. 5 depicted in exemplary manner, FIG. 7 the pulse from FIG. 6 after passing through a photodiode and an amplifier, FIG. 8 an appertaining camera system, FIG. 9 a schematic circuit diagram of a circuit in accordance with the invention for a light propagation time measurement in a further exemplary embodiment using only one light path.

In the exemplary embodiment, two different control loops shown at the bottom of FIG. 1 are used at the same time. On the one hand, the received amplitude from both LED paths is controlled to the same value at the input of the photodiode (receiver 13) by an amplitude control on at least one of the two LEDs, as is known from EP 706 648 B1. Since, after switching over from one LED to the second LED, the phase difference in the form of amplitude information is heavily extended in length, the signal should firstly be examined for clock synchronous amplitude differences at a time point when the propagation time information has already decayed. In practice, a clock frequency of e.g. approximately 100 KHz-200 kHz has proved to be well suited, whereby, in a first part of a clock period, the signal is examined for propagation time differences prior to the phase compensation, which time differences do then appear as an amplitude in the signal, and, in the second part of a clock period, it is examined for purely amplitude differences. With the information from the second half of a clock period, at least one of the two LEDs in the embodiment is then only affected in amplitude in order to obtain signals of approximately equal magnitude from both light paths and thereby control the difference value to zero. Equally large signals from both light paths lead to a zero signal without clock synchronous alternating components.

Self-evidently, the phase of the LED radiating directly into the photodiode does not necessarily have to be adapted in correspondence with the light propagation time of the other one, the LED causing the reflection, with appropriate circuitry the reflection-causing LED can also be affected.

The advantages mentioned hereinabove are achieved by each of these two closed control loops due to the amplitude control propagation time control to a "0-clock synchronised" component.

When using a camera with individually addressable pixels, it is self-evident that the distance to the reflecting object can be determined for each pixel. In the application to a camera, the system described also offers the advantage that the items of information for the distance, the reflection and the image content are present separately. Since the distance measuring process at a respective pixel regulates a "0 signal", the actual measurement does not interfere with the image information which falls back on an external light source (natural daylight, sun).

Figure 8:
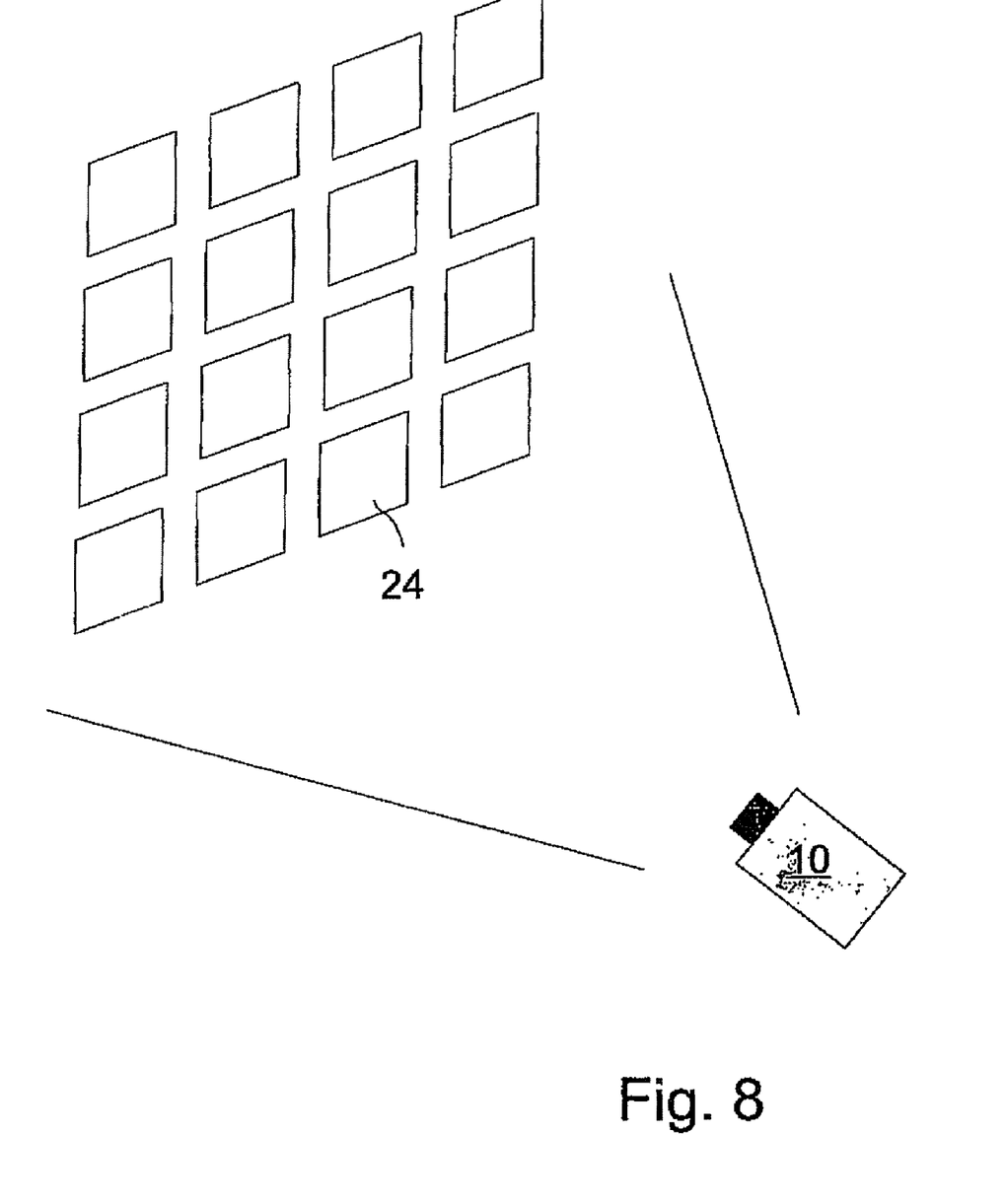

With reference to FIG. 1, the light in the arrangement in accordance with the invention is supplied to the receiver 13 over a second light path 20 and in addition an amplitude compensation is provided. The method serves for a light propagation time measurement, in particular for cameras 10 (FIG. 8). Firstly, a light beam modulated at e.g. 200 kHz over line 30, 31, 32 from the output 11E of a clock pulse control 11 is radiated into a light path 14 by the transmitter 12. Line 30 leads to the input 18a of a power output regulator 18 and from the output 18b thereof via the line 32 to the input 12a of the transmitter 12. The light passes from the transmitter 12 to the object O and from there, it is radiated back to the receiver 13. At the same clock rate but inverted by the inverter 22, light is radiated also into the receiver 13 from a further transmitter 21 serving as a compensation light source or from a not shown compensation light source. To this end, the signal from the clock pulse control 11 arrives over line 30, 33 at the input 17a of the phase shifter 17 and from the output 17b of the phase shifter and line 34 it reaches the input 22a of the inverter 22, from the output 22b of which the signal passes over line 35 to the input 21a of the further transmitter 21. Thus the signal S13 from the two light paths is present on the line 40 at the output 13a of the receiver 13 alternately at the clock rate of the clock pulse control 11. The further signal, which originates from the further transmitter 21, is likewise a light signal clocked by the clock pulse control 11 in the embodiment of FIG. 1, which is preferably supplied to the receiver 13 in parallel with the first light signal from the light path 14. In the case of this signal however, the light traverses nearly no path or a path that is known in regard to the distance thereof. The signal S13 reaches the amplifier 23 over the line 40 and is amplified in the amplifier and is then supplied over the line 41 to two similarly constructed synchronous demodulators D1, D2 incorporating comparators, as is illustrated in the lower part of FIG. 1. Hereby, the task of the synchronous demodulators D1, D2 is not to detect the phase exactly, but rather, the amplitude in a clocked manner. The phase accuracy does not have any influence on the accuracy of the measurement so that a phase shift of e.g. 20° is still irrelevant.

Figure 2:
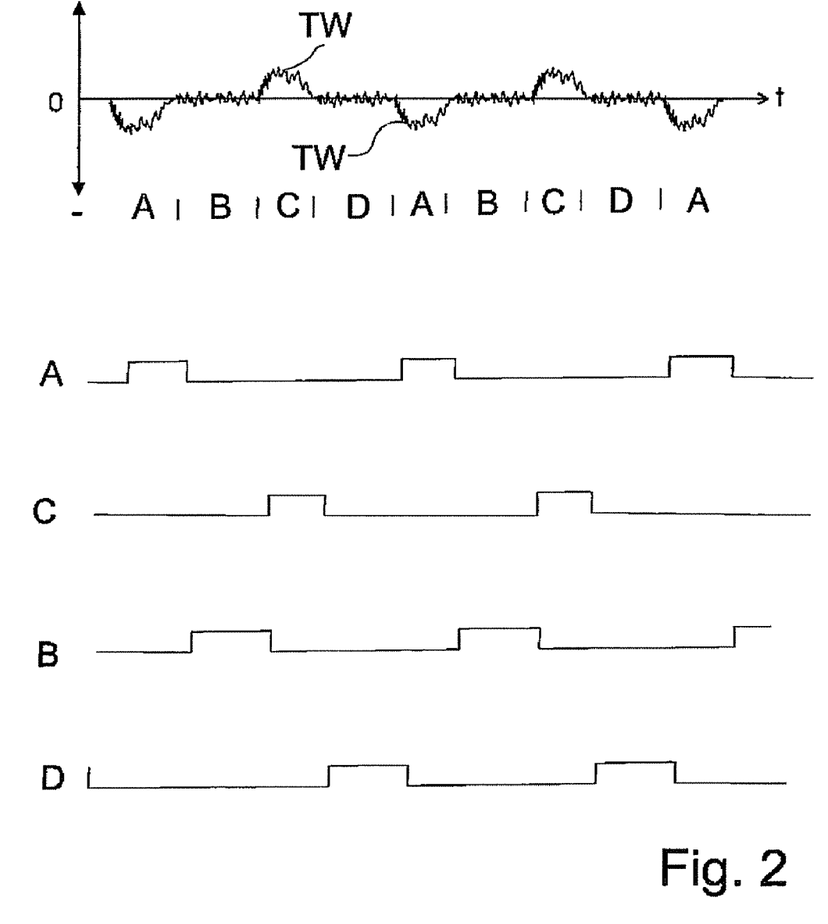

Before going into these circuits in greater detail, the upper part of FIG. 2 shows the signal as it is after the amplifier 23. The illustrated signal has a signal waveform such as is present for a light propagation time over a reflection distance of e.g. 15 cm without an adjustment to the signal phase of at least one of the two LEDs of the transmitter 12 and the further transmitter 21. The occurrence of the clock synchronous signal components can be detected by an appropriate gate circuit and assigned to the corresponding LEDs. Hereby, one should distinguish between amplitude differences occurring over the entire clock range and signal amplitudes occurring immediately after a switch-over of the clock rate. To this end, a clock cycle is sub-divided into 4 sections A/B/C/D in FIG. 2. The sections B, D represent amplitude values which are equal in the regulated state without clock synchronous amplitude differences, thus i.e. from clock pulse to clock pulse. The regulated state of the sections B, D relates to the amplitude control for at least one of the two LEDs. In the regulated state of the amplitudes to the same values in the clocked sections B and D, there is a signal without synchronous signal components on the photodiode in the case of an equal propagation time from both LEDs. It is only in the event of a propagation time difference between the further light path 20 and the light path 14 that a clock synchronous signal component appears.

In FIG. 1, the synchronous demodulators D1 and D2 incorporating the comparators are controlled by the clock pulse control 11 via the outputs 11A, 11B, 11C and 11D and the appertaining clocking lines 50A, 50B, 50C and 50D in such a way that the synchronous demodulator D1 regulates the clock synchronous amplitude difference in the received signal S13 by means of the power output regulator 18 for the purposes of regulating the amplitude to "0", whereas the synchronous demodulator D2 detects the propagation time difference between the light paths and regulates it to "0" by means of the phase shifter 17. In the case of a non-regulated light propagation time, there is a clock synchronous signal component in the clock sections A and C which alternates in polarity from phase to phase and leads to a amplitude difference value S16 at the output of the synchronous demodulator D2, which amplitude difference signal as control signal in turn controls the phase shifter 17 in such a way that a "0" signal without clock synchronous signal components is present at the output 23b of the amplifier 23.

In the synchronous demodulator D1, the received signal S13 is broken down again into the two light paths 14 as well as 20. To this end, the signal reaches the switches associated with the sections B and D over the line 41, 41B, 41D, said switches being actuated over the clocking line 50B and 50D by the clock pulse control 11 at the clock pulse alternation rate of the sections B and D. Thus, in correspondence with the switching position at the output of the switches, the signal corresponding to the sections B and D is present on the line 60B and 60D. These signals are supplied via an integrator R3, R4 and/or C3, C4 to the inputs 15a, 15b of the comparator 15, at the output 15c of which there is a corresponding control signal for a zero state of the signal S13 in the event of signals of equal magnitude. If another signal is present there, an arbitrary control signal in the form of signal S15 for the amplitude control effected by the power output regulator 18 appears over the line 70 at the input 18c of the power output regulator 18 which readjusts the radiating power of the transmitter 12 in terms of the amplitude thereof in such a way that the signal S13 becomes a signal corresponding to the zero state, i.e. one that contains no clock synchronous components and thus no further adjustment is necessary. In this state, the clock synchronous alternating components are eliminated i.e. influences which are brought about by the e.g. reflection properties, extraneous light or changes in temperature do not have any effect upon the light propagation time measurement. In the drawing, it is the radiating power of the transmitter 12 that is readjusted, however it is self-evident that this regulation process could equally be effected on the further transmitter 21 or on both or on a plurality of transmitters in the case of a plurality of transmitters as is also known from EP 706 648 B1. The same applies to the case of a compensation light source which is directly associated with the receiver 13. At the same time, the signal S15 is thereby the signal 94 for the reflection or the amplitude.

In other words, the synchronous demodulator D1 is used for a clock-section type amplitude detection, at the input of which, i.e. at the switches associated with the sections B and D there is preferably already present a signal regulated to zero from both paths of an optical balance. To this end in FIG. 1, two light paths are led outwardly independently of each other, and the amplitudes thereof are regulated in such a manner that they are already mutually zero at the input of the synchronous demodulator D1 and no varying signal occurs. This is effected by the switches associated with the sections B and D that are illustrated in the lower part of FIG. 1 for the purposes of compensating for external influences, this being necessary for the desired accuracy. From the zero signal which then remains, the clock pulse alternation signal can be detected in the noise at the output of the amplitude detector in the form of the synchronous demodulator D2.

A phase change of the sampling periods over the clocking lines 50A, 50B, 50C, 50D has no effect upon the distance measurements over wide ranges. In contrast to the high precision that is needed for the phase of the synchronous demodulator in DE 100 22 054 A1, this does not enter into the distance measurement process in accordance with the invention. It is only necessary to sample the amplitude at an approximate time point of the clock rate. In consequence, the synchronous demodulation process in accordance with the invention is only a quasi synchronous demodulation process. The phase itself is of little importance for enabling differences in the amplitude of the clock pulse alternation signals to be detectable and for reducing the amplitude at the input of the amplitude detector in the form of the synchronous demodulator D2 to zero. These clock pulse alternation signals are then mutually minimized by means of the phase shift of the components and preferably reduced to zero. The delay of the phase shifter 17 resulting thereby is the light propagation time.

In the centre of FIG. 1, the two upper switches of the synchronous demodulator D2 are controlled by the gate circuit in correspondence with the sections A and C in accordance with the upper part of FIG. 2. In the synchronous demodulator D2, the received signal S13 is likewise associated with the amplitude signals of the two light paths 14 as well as 20, but here, the signal sections corresponding to the sections A and C. To this end, the signal arrives over the line 41, 41A, 41C at the switches which are associated with the sections A and C and which are actuated over the clocking line 50A and 50C by the clock pulse control 11 at the clock pulse alternation rate of the sections A and C. Thus, in correspondence with the switching setting, the signal on the line 60A and 60C corresponding to the sections A and C is present at the output of the switches. These signals are supplied to the inputs 16a, 16b of the comparator 16 via the integrators R1, R2 and/or CG, C2.

Figure 3:
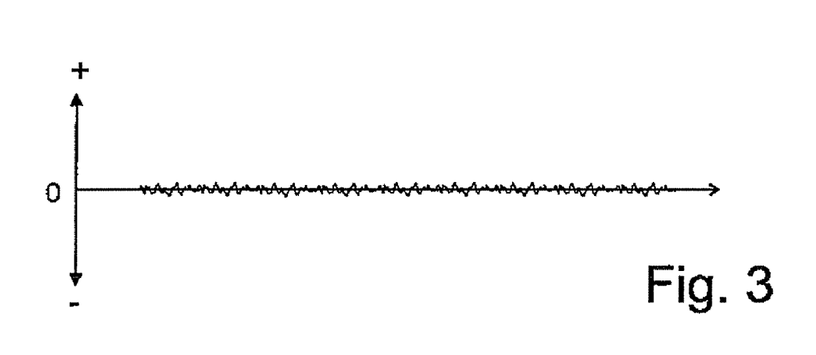

In consequence, the first light signal corresponding to the light propagation time in the light path and occurring at a clock pulse alternation and the second signal, i.e. a further light signal are detected in a clocked manner. The magnitudes of the signals insofar as their amplitudes are concerned are of course dependent on the reflection, but as we are concerned here with the determination of the clock synchronous amplitude difference in value between these two signals, this plays no part. The two signals are compared in the further comparator 16. The amplitude difference value S16 corresponds to the phase difference between the first light signal and the second signal and is converted into an amplitude value by virtue of the integration process in the photodiode. This value can be sampled at any arbitrary time point at which phase information is no longer present. This amplitude difference value S16 for the not phase exact amplitude values, i.e. amplitude values not agreeing precisely with the phase boundaries, arrives at the input 17c of the phase shifter 17 over the line 80 in the form of a signal and is so changed in the phase shifter 17 until such time as it reaches its minimum and preferably zero in order to thereby determine the light propagation time. From the delay of the phase shifter 17 that has been set thereby, the light propagation time can be determined and thus the distance which is present at the output 17d of the phase shifter 17 in the form of the signal propagation time 93. Due to the change of the phase shifter, the amplitudes of the clock pulse alternation signal TW disappear in the noise in accordance with FIG. 3.

The phase shifter 17 can be an analogue working circuit, but it could also be a digital signal delay arrangement. Hereby for example, a high frequency clock rate can be counted out in such a way that the clock rate can be displaced into e.g. 1 ns steps. To this end, the signal due to the amplitude difference value S16 is sampled by an A/D transducer and the result is converted into a corresponding phase shift.

Figure 9:
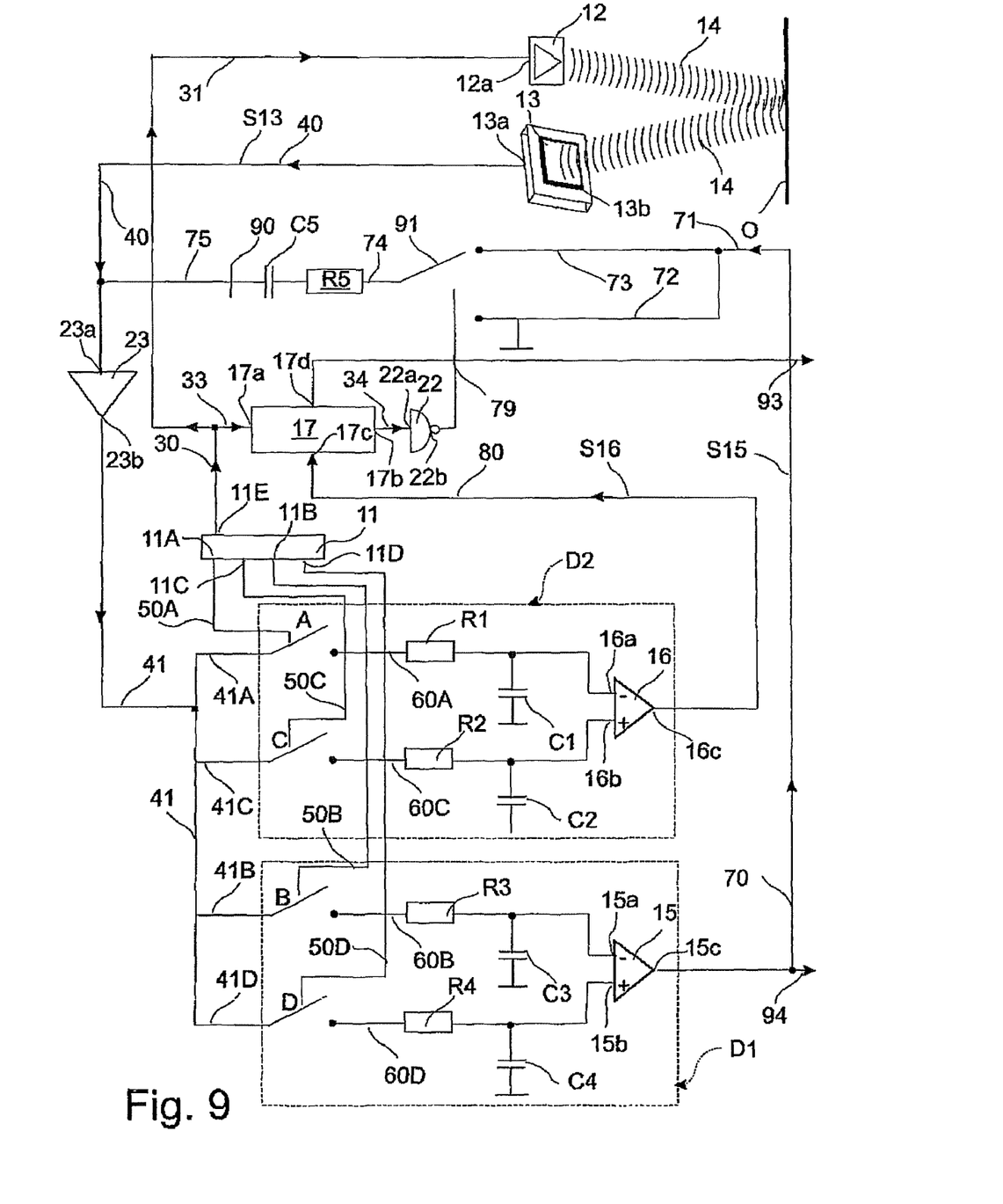

FIG. 9 shows a schematic diagram of a further embodiment wherein the second signal is not led over a light path to the amplifier 23 but rather in an electronic manner. Insofar as the same components and lines are used in this embodiment as in the embodiment of FIG. 1, the same reference symbols are used. To this extent, the components after the amplifier, i.e. the synchronous demodulators D1 and D2 as well as the results obtained therefrom, i.e. the signals S15 and S16 as well as 93 and 94 are identical. Also the light path 14 and the transmitter 12 and its control system are identical to the embodiment of FIG. 1 with the exception of the power output regulator 18. However, the signal S15 arrives over the lines 70 and 71 at a distribution point at which it is fed onto the lines 72 and 73. The switch 91 is controlled by the clock pulse control 11 from the same output 11E at the same clock rate as the transmitter 12 but is inverted however by the inverter 22. To this end, the signal from the clock pulse control 11 arrives at the input 17a of the phase shifter over the line 30, 33, and from the output 17b of the phase shifter and the line 34 it reaches the input 22a of the inverter 22, from output 22b of which the signal is passed over the line 79 to the switch 91. Thus, in alternating manner at the clock rate of the clock pulse control 11, either the signal S15 on the line 73 or a signal over the line 72 is present on the line 74 after the switch. Thus, the signal transmitted in an electronic manner has not traversed the light path and is consequently faster around the light path than the signal S 13 by the speed of light. The signal on the line 74 is passed on via the integrator R5 together with C5 and a DC decoupling means 90 and is supplied by way of the line 90 and the line 40 to the amplifier 23. From there, the signals arrive at the two synchronous demodulators D1, D2, which are similarly constructed as in the embodiment of FIG. 1 and are incorporating comparators, via the line 41 whereupon the same processing takes place as in the first embodiment.

An asymmetrical arrangement of this type reacts more sensitively to external influences so that it is in a position to take countermeasures. One possibility consists in using a partially light-proof coated photodiode as the receiver 13. To this end, the e.g. edge 13b of the photodiode can be coated such as to be light-proof. Light incident on the photodiode, above all if it does not impinge the photodiode in a directly frontal manner, leads to the electrical signal having rise times differing from those for light falling frontally thereon. The result of the measurement can thus be falsified.

The previous explanation is concerned with the representation of a pixel. Naturally, several or many pixels could also be arranged in an array which then forms an e.g. observation region with an objective lens. In this case for example, the distance for each pixel is determined individually in sequential manner.

In practice, it turns out that different incident angles of the reflected signal and the directly irradiated LED lead to a falsification in the result of the measurement. From DE 103 22 552 A1, means are known for causing two different optical paths to meet the photodiode at a virtually equal angle. The light signal originating from the further transmitter 21 is thus diverted by translucent or transparent diverting means 25 until it enters the receiver in parallel with or at the same angle as the light originating from the light path 14. Preferably, the second signal is at least partly diverted into the receiver 13, whereas the first light signal originating from the light path 14 enters the receiver substantially unaltered.

The clock pulse control 11 preferably works at a clock rate of between 50 to 200 kHz. These clock rates are significantly smaller than the clock rates employed up to now for light propagation time measurements in the state of the art. In consequence, larger and more expedient photodiodes can be used. In addition, one can work with low-frequency amplifiers.

Since the transmitted clock synchronous light signal is regulated to a clock synchronous zero-component in the photodiode for the purposes of a light propagation time or distance measuring and for reflection measurement, these measurements do not interfere with the non-clock-synchronous image information of the pixels of a camera. The clock synchronous zero-component appears only as a small additional constant light level. When effecting an amplitude control in the compensation control loop, this constant light level alters with the strength of the reflection at the reflecting objects. Since, however, the value of the reflection is contained in the signal S15, the actual brightness value measured by the pixel can be appropriately corrected therewith. In practice, a correction has not proved necessary in most cases, on the contrary, the transmitted light leads to a desired illumination of the object when the environmental light is failing.

When used with only one pixel, a conventional LED can be used as the transmitting element, whilst a large surface area low cost photodiode, e.g. BPW 34 by Osram can be used as the photodiode. The photodiode amplifier can be produced using CMOS technology and have a bandwidth of e.g. only 200 KHz. The parameters of the amplifier hardly enter into the accuracy of the measurement so that only small demands are imposed here. If one avoids a digitally realizable phase shift (high clock frequencies) of the reference signal in accordance with the state of the art that is not described in detail in the invention, the system can be operated at a system clock rate of only 50 to 200 KHz. In the case of avoidance of high clock frequencies exclusively for the generation of a digital phase shift, one can self-evidently have recourse to any type of phase shift arrangement, e.g. one in analogue integrated form.

An advantage of the invention is also the arbitrary choice of the clock frequency which can adopt arbitrary values from one clock cycle to the next. Thus, for the purposes of suppressing possible interference in the case of parallel and non-synchronisable systems being used, an arbitrary "frequency-hopping" (FDMA) arrangement can be used in problem-free manner. In consequence, this system is suitable for realizing not just one individual light propagation time measuring path with simple means, but also enables a 3-D capable system to be produced from a conventional camera, preferably a CMOS camera. The conventional image information is also available at the same time in the invention described despite the process of measuring the distance of objects located in the illumination range of the trans-mission source.

In accord with the present invention, a light propagation time measurement is possible which enables an accurate light propagation time detection process to be effected even with a very noisy received signal from an extremely close range up to the largest of distances using the simplest of means, the smallest transmitting power and with complete insensitivity to extraneous light and temperature without adaptation of the electronics. The reflection properties of the object being measured also have no effect upon the result of the measurement. In principle hereby, transmitter or compensator (i.e. further transmitter or an electronic compensation process for example) or indeed both are regulated in phase or power output.

The elements of the appertaining device are already apparent from the previous explanation, in particular, with reference to FIGS. 1 and 9. At least one transmitter 12 sends a first light signal clocked by the clock pulse control 11 into at least one light path 14 via a reflecting object O to at least one receiver 13 for detecting the change in the first light signal in consequence of the approach, presence and/or distancing of the object O. The receiver 13 receives the first light signal coming from the light path 14. Means are provided in the receiver 13 for assessing the received signal in consequence of the first light signal. Furthermore, means are provided for transmitting a second signal which is clocked by the clock pulse control 11 and which appears without the light path 14 or over a path which is known in regards to its distance. This transmission is effected in the first embodiment by means of the further transmitter 21 via the further light path 20, but can also take place in accordance with FIG. 9 in an electronic manner. A comparator 14 compares the received signal from the light path 14 with the second signal in a clocked manner for the purposes of producing a reference value at the output of the comparator 15. At least one regulator 18 uses the reference value for the regulation of the amplitude values of the transmitted signal and/or the second signal in such a way that the received signal and the second signal are substantially of the same magnitude at least at the input of the comparator. Means are provided in the form of a gate circuit for detecting in a clocked manner the clock pulse alternation signal TW occurring at a clock pulse alternation and corresponding to the light propagation time between the received signal from the light path 14 and the second signal when the magnitude of the signal received from the light path 14 and the second signal has been regulated to be of substantially the same magnitude at the input of the comparator 15. A further comparator 16 determines a amplitude difference value S16 by comparison of the clock pulse alternation signals TW between the received signal from the light path 14 and the second signal. A phase shifter 17 changes the amplitude difference value S16 by changing the phase delay of the phase of the received signal and the second signal until the amplitude difference value S16 is a minimum, preferably zero. The delay of the phase shifter occurring when the amplitude difference is at a minimum corresponds to the light propagation time.

The comparator 15 is part of a synchronous demodulator D1 intended for the detection of the amplitude. The means for detecting the clock pulse alternation signal TW in a clocked manner is a gate circuit which detects the clock pulse alternation signals TW alternating in prefix sign. The amplitude difference value S16 between the clock pulse alternation signals TW is used as a control variable for a control loop. This gate circuit and the further gate circuit of the clock synchronous demodulators D1, D2 with the appertaining comparators serve as means for dividing the received signals S13 from the light path 14 and the path over which the second signal is led, into the different sections A, B, C, D.

Diverting means 25 are provided which guide the first light signal and the second signal that is likewise coming in the form of a light signal from a second light path in FIG. 1 to the receiver 13 and divert the diverted light signal in such a way that the light signals are incident on the receiver 13 such as to be substantially parallel or at equal angles.

LEDs are used at least partly, preferably universally as the at least one transmitter 12, the further transmitter 21 and/or the compensation light source.

It is to be understood that this description can be subjected to the most diverse types of modifications, changes and adaptations which fall within the scope of equivalents to the attaching claims.

The invention claimed is:

1. A method for light propagation time measurement, comprising the steps:
    sending a first light signal that is clocked by a clock pulse control from at least one transmitter into at least one light path via a reflecting object to at least one receiver for detecting a change of the first light signal in consequence of the approach, presence and/or distancing of the reflecting object,
    receiving the first light signal coming from the at least one light path by means of the at least one receiver,
    determining a received signal in consequence of the first light signal at the receiver,
    transmitting a second signal that is clocked by the clock pulse control and which appears without the at least one light path or via a path which is known in regard to its distance,
    comparing the received signal from the light path with the second signal in a clocked manner for producing a comparison value at the output of at least one comparator , detecting in a clocked manner a clock pulse alternation signal (TW) occurring at a clock pulse alternation and corresponding to the light propagation time between the received signal from the at least one light path and the second signal, determining an amplitude difference value by comparison of the clock pulse alternation signals between the signal received from the at least one light path and the second signal in the comparator, changing the amplitude difference value by means of a phase shifter in changing a phase delay of the phase of the received signal and of the second signal until the amplitude difference value is minimal, evaluating the phase delay of the phase shifter occurring at the minimum amplitude difference value for a determination of the light propagation time, wherein the received signal from the at least one light path is compared with the second signal in a clocked manner for producing a comparison value at the output of a first comparator which is used for the control of the amplitude values of at least one of the transmitted signal or the second signal in such a way that the received signal and the second signal are of the same magnitude at least at inputs of the first comparator, wherein the detecting in a clocked manner the clock pulse alternation signal is effected when the magnitude of the signal received from the at least one light path and the second signal have been controlled such as to be of equal magnitude at the inputs of the first comparator, and wherein the determining the amplitude difference value by comparison of the clock pulse alternation signals between the signal received from the light path and the second signal is effected in a further comparator.

2. A method in accordance with claim 1, wherein the second signal is likewise a received signal which is received from a second light path by means of the at least one receiver.

3. A method in accordance with claim 1, wherein by transmitting the second signal over an electronic path.

4. A method in accordance with claim 1, wherein the comparison of the signal received from the at least one light path and the second signal for producing the comparison value takes place at the first comparator of a clock synchronous demodulator provided for the amplitude detection, wherein the comparison value controls amplitude values of at least one of the transmitted signal or the second signal in such a way that the signal received from the at least one light path and the second signal are substantially of the same magnitude.

5. A method in accordance with claim 1, wherein when detecting in a clocked manner the clock pulse alternation signal occurring at a clock pulse alternation between the first light signal and the second signal or the second signal and the light signal, the amplitude of the clock pulse alternation signal is detected in the noise of the regulated state when the magnitude of the received signal and the second signal have been regulated to be of substantially equal magnitude at the inputs of the first comparator.

6. A method in accordance with claim 1, wherein a photodiode is used as the at least one receiver which is partially coated so as to be light-proof.

7. A method in accordance with claim 1, wherein the amplitude of the clock pulse alternation signal is detected and a control loop controls the phase shifter in such a way that the amplitude of the clock pulse alternation signal becomes minimal.

8. A method in accordance with claim 1, wherein the clock pulse alternation signals alternating in prefix sign are detected by a gate circuit, and wherein the amplitude difference value between the clock pulse alternation signals is used as a control variable in a control loop in order to control the amplitude difference value to zero.

9. A method in accordance with claim 1, wherein the received signals from the at least one light path and from the path over which the second signal is led are sub-divided into different sections, wherein the sections which lie between the sections of the clock pulse alternations are used for comparing the signal received from the at least one light path and the second signal by means of a gate circuit at a clock rate of the clock pulse control for producing the comparison value at the output of the comparator (15.

10. A method in accordance with claim 1, wherein the first light signal and the second signal being also a light signal from a second light path, are supplied to the at least one receiver via diverting means which divert the diverted light signal in such a way that the light signals are incident on the at least one receiver in parallel or at the same angle.

11. A method in accordance with claim 1, wherein, for regulating the amplitude, at least one of the LEDs is regulated which are provided as the at least one transmitter, the further transmitter , or the compensation light source.

12. A method in accordance with claim 11, wherein the control voltage arising thereby is evaluated as a measured value for the determination of the reflection of the object.

13. A method in accordance with claim 1, wherein the signals determined in the sections (A, C) of the clock pulse alternations are used for distance measuring.

14. A device for light propagation time measurement, comprising:

a clock pulse control , at least one transmitter for sending a first light signal that is clocked by the clock pulse control into at least one light path via a reflecting object to at least one receiver for the detection of the change of the first light signal in consequence of the approach, presence and/or distancing of the object, at least one receiver for receiving the first light signal coming from the at least one light path, a determinator for determining a received signal in consequence of the first light signal at the at least one receiver, a transmitter for transmitting a second signal that is clocked by the clock pulse control, which appears without the light path or via a path which is known in regard to its distance, at least one comparator for comparing in a clocked manner the received signal from the at least one light path and the second signal for producing a comparison value at an output of the at least one comparator, at least one regulator for controlling amplitude values of at least one of the transmitted signal or the second signal, a detector for detecting in a clocked manner the clock pulse alternation signal occurring at a clock pulse alternation and corresponding to the light propagation time between the signal received from the at least one light path and the second signal, a comparator for determining an amplitude difference value by comparison of the clock pulse alternation signals between the signal received from the at least one light path and the second signal, a phase shifter for changing the amplitude difference value in changing the phase delay of the phase of the received signal and the second signal until the amplitude difference value is minimal, an evaluator for evaluating the delay of the phase shifter which delay is occurring at the minimum amplitude difference value for the determination of the light propagation time wherein the at least one regulator for controlling the amplitude values of at least one of the transmitted signal or the second signal uses the comparison value in such a way that the received signal and the second signal are of the same magnitude at least at the inputs of a first comparator, and that a further comparator for determining the amplitude difference value of the clock pulse alternation signals is arranged downstream of the first comparator in such a manner, that the detecting in a clocked manner the clock pulse alternation signal by the detector for detecting in a clocked manner is effected when the magnitudes of the signal received from the light path and the second signal have been regulated because of the comparison value of the first comparator such as to be of equal magnitude at the inputs of the first comparator.

15. A device in accordance with claim 14, wherein a further transmitter is provided for transmitting the second signal into a second light path to the at least one receiver.

16. A device in accordance with claim 14, wherein means are provided for transmitting the second signal over an electronic path.

17. A device in accordance with claim 14, wherein the comparator is part of a synchronous demodulator (D1) provided for the amplitude detection.

18. A device in accordance with claim 14, wherein the at least one receiver is a photodiode partially coated so as to be light-proof.

19. A device in accordance with claim 14, wherein the detector for detecting the clock pulse alternation signal in a clocked manner is a gate circuit which detects the clock pulse alternation signals alternating in prefix sign, and in that the amplitude difference value between neighbouring clock pulse alternation signals is used as a control variable in a control loop.

20. A device in accordance with claim 14, wherein a divider is provided for dividing the signals received from the at least one light path and the path over which the second signal is led into different sections, wherein a gate circuit is provided as detector for detecting in a clocked manner the sections which lie between the sections of the clock pulse alternations.

21. A device in accordance with claim 14, wherein diverting means are provided which supply the first light signal and the second signal being also a light signal from a second light path to the at least one receiver and which diverts the diverted light signal in such a way that the light signals are incident on the at least one receiver in parallel or at the same angle.

22. A device in accordance with claim 14, wherein at least one of the at least one transmitter, the further transmitter or a compensation light source is an LED.

* * * * *